Patented May 13, 1952

2,596,276

UNITED STATES PATENT OFFICE 2,596,276

POWER DRIVE MECHANISM FOR APPARATUS FOR GENERATING ELECTRICAL ENERGY

John Napoli, Monterey, Calif.

Application January 3, 1949, Serial No. 68,990

5 Claims. (Cl. 74—720)

This invention relates to improvements in apparatus for generating electrical energy.

An object of the present invention is to provide new and improved apparatus embodying a hydraulically operated rotor which is arranged to impart rotary motion to a device carrying a number of circularly arranged nozzles for directing jets of water against the rotor, whereby the said device may be continuously rotated to operate an electrical generator or other mechanism.

Another object of my invention is to provide an improved power plant of a type capable of being utilized to generate electrical energy or operate mechanical equipment, embodying novel means whereby a rotatable water distributing device equipped with a series of circularly arranged nozzles may be utilized to direct jets of water tangentially against a rotor, which upon being thereby rotated is adapted to impart rotary motion to the said device.

Other and further objects of my invention will be pointed out hereinafter, or will be indicated in the appended claims, or will be obvious to one skilled in the art upon an understanding of the present disclosure. For the purpose of this application I have elected to show herein certain forms and details of apparatus for generating electrical energy or operating mechanical equipment representative of my invention; it is to be understood, however, that the embodiment of my invention herein shown and described is for the purpose of illustration only, and that therefore it is not to be regarded as exhaustive of the variations my invention may assume.

In the accompanying drawings:

Fig. 3 is a sectional view taken on the line 3—3 of Fig. 1; and

Fig. 4 is a sectional view taken on the line 4—4 of Fig. 1.

Figure 1:
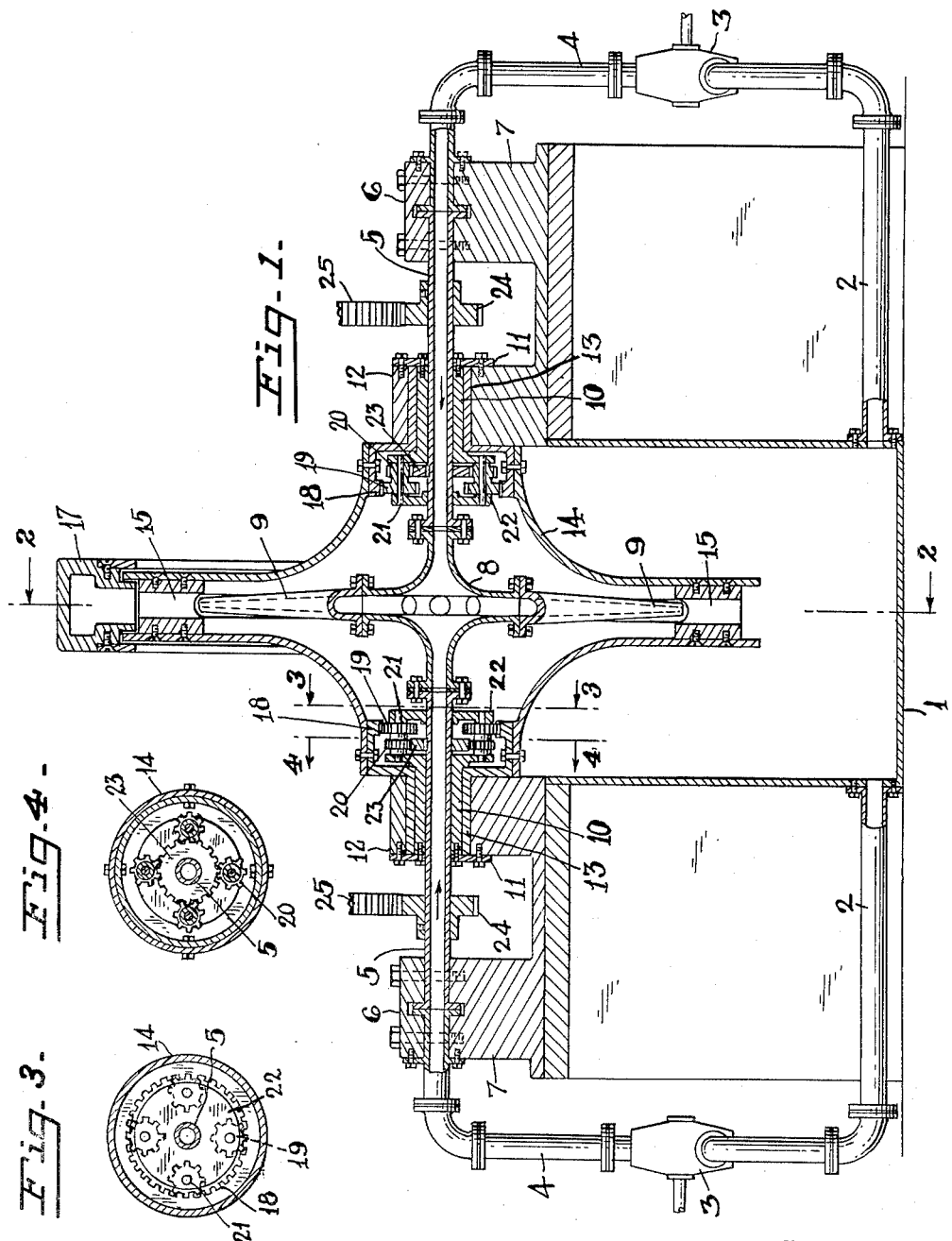
Fig. 1 is a vertical sectional view of apparatus embodying the principles of my invention.

Referring to the drawings the numeral 1 designates a water tank in which a supply of water is maintained for the operation of the apparatus. Connected to the tank below the water level are two lines 2 for conveying water to the inlet sides of electrically or other suitably operated pumps 3. The discharge sides of the pumps are connected to conduits 4 which lead to the inlet ends of aligned rotatable pipes or tubular shafts 5. The abutting flanged ends of the conduits 4 and the pipes 5 are held against displacement by grooved plates 6 which are bolted to grooved bases or supports 7. The rotatable pipes 5 are axially connected to the opposite sides of a hollow water distributing member 8 which has a series of suitably spaced curved water discharge nozzles 9 secured thereon. The discharge nozzles 9 are substantially of the same shape and each has a restricted outlet opening at its outer end through which water under pressure is discharged with considerable velocity. The pipes 5 are rotatably supported in flanged stationary bearing members 10 which are secured to the supports 7 by means of thrust bearing plates 11.

Rotatably supported on the stationary bearing members 10 and arranged in contacting relation with the supports 7 and arcuate members 12 are the hub portions 13 of a hollow rotor 14. The arcuate members 12 are secured to the thrust bearing plates 11 by screws or other means, and they are also bolted to the supports 7. Although not shown on the drawings suitable anti-friction bearings of the usual kind are provided between the pipes 5 and the stationary bearing members 10 and also between the hub portions 13 of the rotor 14 and both the stationary bearing members 10 and the supports 7. The hub portions 13 of the rotor abut the thrust bearing plates 11 and suitable packing material of the usual kind is preferably provided where needed to prevent any water from passing outwardly between the bearing surfaces from the interior of the rotor 14.

The hollow rotor 14 is positioned in an enclosing position with respect to the water distributing member 8 and its nozzles 9. At the periphery of the rotor 14 are arranged a plurality of suitably spaced deflector blades or members 15 which have uniformly curved surfaces 16 against which the water discharged from the nozzles 9 impinge. The deflector blades 15 are suitably spaced one from another so that water from the nozzles 9 upon striking their curved surfaces 16 passes outwardly without creating any back pressure which might retard the rotation of the rotor 14 or the water distributing member 8. Arranged around the upper portions of the rotor's periphery is a housing 17 which intercepts the water deflected from the blades 15 of the rotor and causes it to be returned to the tank 1 which is positioned beneath and partially around the rotor.

Figure 2:
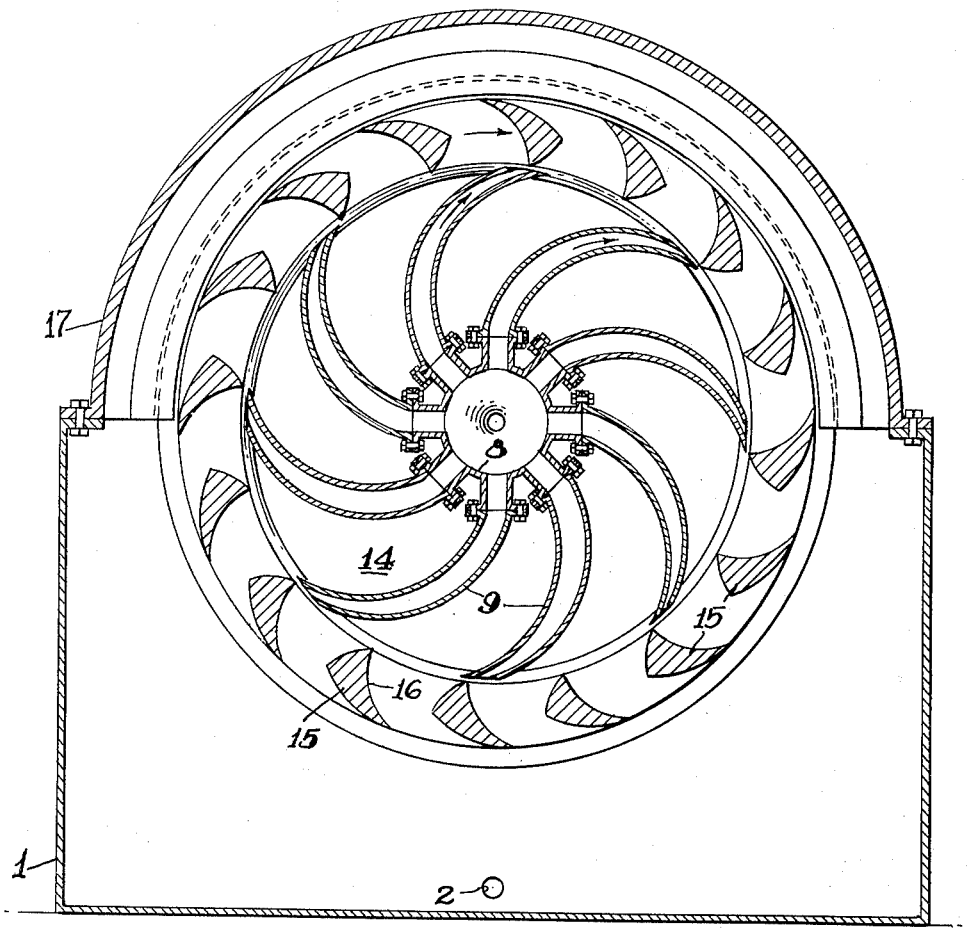
Fig. 2 is a sectional view taken on the line 2—2 of Fig. 1.

The nozzles 9 are so uniformly shaped, constructed and arranged that they simultaneously discharge streams of water somewhat tangentially against the spaced peripheral deflector blades 15 of the rotor. The curved surfaces 16 of the said blades being positioned to intercept the streams of water discharged from the nozzles 9 are arranged so that when a stream from one nozzle passes across and from the surface of one blade it will immediately intercept and strike against the surface of the succeeding blade, and so on around the rotor. The force of the streams of water striking against the blades 15 causes the rotor 14 to rotate in a clockwise direction (Fig. 2). The discharge of water from the nozzles causes rotary motion in a counter-clockwise direction to be imparted to the water distributing member 8 (Fig. 2).

Secured to the hub portions 13 of the rotor are internal ring gears 18 which mesh with gears 19, each of the latter being secured to or formed integrally with a similar but smaller gear 20. Each set of gears 19 and 20 are rotatably mounted on a shaft 21 which is secured at its ends to the flanged portion of a stationary bearing member 10 and to a disc 22 loosely mounted on a rotatable pipe 5. As shown in Figs. 3 and 4 there are four sets of gears 19 and 20 arranged in the opposite portions of the rotor's hub. The smaller gears 20 are in mesh with ring gears 23 which are keyed to the pipes 5. It will therefore be noted that as the rotor 14 is rotated as previously described in a clockwise direction it will simultaneously impart rotary motion to the pipes 5 and the water distributing member 8 to rotate in the opposite direction. Keyed to the pipes 5 are circular gears 24 which are operatively engaged by similar gears 25, the latter being suitably connected to an electrical generator or other mechanism which is to be operated.

What I claim is:

1. Apparatus of the class described comprising a hollow rotatable water distributing member mounted for rotation about a horizontal axis and carrying a plurality of nozzles arranged in circularly spaced relation, the said water distributing member having axial water inlet openings in its opposite sides, horizontally disposed axial conduits secured to the opposite sides of the water distributing member and having communication with the inlet openings of the said member, a rotatable hollow rotor surrounding the water distributing member and carrying peripheral blades arranged in circularly spaced relation, the said blades being positioned to intercept water discharged from the nozzles, mechanical means operatively connecting the conduits and the rotor, and means for supplying water under pressure to the conduits.

2. Apparatus of the class described comprising a hollow rotatable water distributing member mounted for rotation about a horizontal axis and carrying a plurality of outwardly projecting nozzles arranged in spaced circular relation, the said nozzles being constructed and arranged to discharge streams of water outwardly and in substantially the opposite direction to the rotation of the water distributing member, the said water distributing member having axial water inlet openings in its opposite sides, horizontally disposed axial conduits secured to the opposite sides of the water distributing member and having communication with the inlet openings of the said member, a hollow rotor enclosing the water distributing member and arranged to rotate in the opposite direction to the water distributing member, a plurality of peripheral circularly arranged spaced blades carried by the rotor, the said blades being positioned to intercept the water discharged from the nozzles, mechanical means operatively connecting the rotor and the conduits, and means for supplying water under pressure to the conduits.

3. In apparatus of the kind described, a rotatable hollow water distributing member carrying a plurality of outwardly projecting nozzles arranged in spaced circular relation, the said nozzles having similarly curved outer end portions and being constructed and arranged to discharge streams of water outwardly and in substantially the opposite direction to the rotation of the said water distributing member, the said water distributing member having axial water inlet openings in its opposite sides, horizontal pipes secured axially to the opposite sides of the water distributing member and arranged in communication with the inlet openings, a hollow rotor enclosing the water distributing member and mounted for rotation in a direction opposite to the direction of rotation of the water distributing member, a number of spaced peripheral blades carried by the rotor and arranged to intercept the streams of water discharged by the nozzles, mechanical coupling means operatively connecting the water distributing member and the rotor, whereby the said member and the rotor are simultaneously rotated means for supplying water under pressure to the pipes, and means connected to the water distributing member for operating a device.

4. In apparatus of the kind described, a rotatable hollow water distributing member mounted for rotation about a horizontal axis and having inlet openings in its opposite sides and carrying a plurality of outwardly disposed spaced nozzles arranged in a common vertical plane in circular formation and adapted to discharge streams of water outwardly and at an angle, the said nozzles having uniformly curved outer end portions, horizontal axial rotatable pipes secured axially to the opposite sides of the water distributing member and having communication with the inlet openings of the said member, a hollow rotor enclosing the water distributing member and mounted to rotate in a direction opposite to the direction of rotation of the water distributing member, a plurality of spaced peripheral blades carried by the rotor and arranged to intercept streams of water discharged by the nozzles, a water tank positioned beneath the rotor, means connected to the water tank for supplying water under pressure to the water distributing member, mechanical means operatively connecting the rotor and the axial pipes, and means connecting the axial pipes to a device to be operated.

5. In apparatus of the kind described, a rotatable hollow water distributing member carrying a plurality of outwardly disposed spaced nozzles arranged in circular formation and adapted to discharge streams of water outwardly and substantially in the same tangential directions, the said water distributing member having axial water inlet openings in its opposite sides, a rotor enclosing the water distributing member and arranged for coaxial rotation in the opposite direction with respect to the said member, a plurality of circularly arranged spaced peripheral blades carried by the rotor and arranged to intercept the streams of water discharged from the nozzles, axial horizontal rotatable pipes secured axially to the opposite sides of the water distributing member and arranged in communication with the inlet openings thereof, and means operatively connecting the axial pipes and the rotor.

JOHN NAPOLI.

REFERENCES CITED

The following references are of record in the file of this patent:

UNITED STATES PATENTS

| Number | Name | Date |
|---|---|---|
| 111,538 | Herron | Feb. 7, 1871 |
| 396,318 | Wolfe | Jan. 15, 1889 |
| 693,946 | Boyce | Feb. 25, 1902 |